United States Patent [19]

Cook

[11] Patent Number: 4,472,984
[45] Date of Patent: Sep. 25, 1984

[54] AUTOMATIC PLANETARY TRANSMISSION

[76] Inventor: Estle A. Cook, Rte. 1, P.O. Box 196, Butler, Mo. 67430

[21] Appl. No.: 358,424

[22] Filed: Mar. 15, 1982

[51] Int. Cl.³ .................... F16H 47/04; F16H 57/10
[52] U.S. Cl. ................................. 74/677; 74/718; 74/768; 74/793; 74/794
[58] Field of Search ............... 74/718, 677, 768, 769, 74/793, 794

[56] References Cited

U.S. PATENT DOCUMENTS

| | | | |
|---|---|---|---|
| 2,336,911 | 12/1943 | Zimmermann | 180/9.2 |
| 2,454,694 | 11/1948 | Grebb | 74/794 |
| 3,204,486 | 9/1965 | De Lalio | 74/687 |
| 3,511,113 | 5/1970 | Rheault | 74/794 |
| 3,750,493 | 8/1973 | Allsup, Sr. | 74/720 |
| 4,134,310 | 1/1979 | Orshansky, Jr. et al. | 74/687 |
| 4,147,075 | 4/1979 | Rasman et al. | 74/720 |
| 4,255,987 | 3/1981 | Ciolli | 74/768 |

FOREIGN PATENT DOCUMENTS

| | | | |
|---|---|---|---|
| 653589 | 11/1937 | Fed. Rep. of Germany | 74/677 |
| 1096768 | 2/1961 | Fed. Rep. of Germany | 74/677 |
| 1937342 | 2/1971 | Fed. Rep. of Germany | 74/677 |
| 2050400 | 1/1979 | Fed. Rep. of Germany | 74/768 |
| 3024024 | 1/1981 | Fed. Rep. of Germany | 74/677 |
| 1006274 | 4/1952 | France | 74/768 |
| 1114618 | 4/1956 | France | 74/794 |
| 1308635 | 12/1962 | France | 74/688 |
| 485657 | 10/1953 | Italy | 74/677 |
| 756113 | 8/1980 | U.S.S.R. | 74/768 |

OTHER PUBLICATIONS

New 3-Member Hydrodynamic Drive Unit, Qualman et al., Aug. 1961, pp. 91–93, SAE Journal.

Primary Examiner—Allan D. Herrmann
Assistant Examiner—D. Wright
Attorney, Agent, or Firm—Schmidt, Johnson, Hovey & Williams

[57] ABSTRACT

A power transmission having axially aligned input and output shafts is provided with a planetary gear train for each shaft respectively with the carriers for the planetary pinions interconnected, with the pinions all meshing with a common ring gear, and with a gear reduction from the input gear train to the output gear train. Power is applied to the transmission through a torque convertor, and initial high torque-low speed operation changes gradually until a one-to-one ratio is established.

8 Claims, 9 Drawing Figures

Fig. 2.
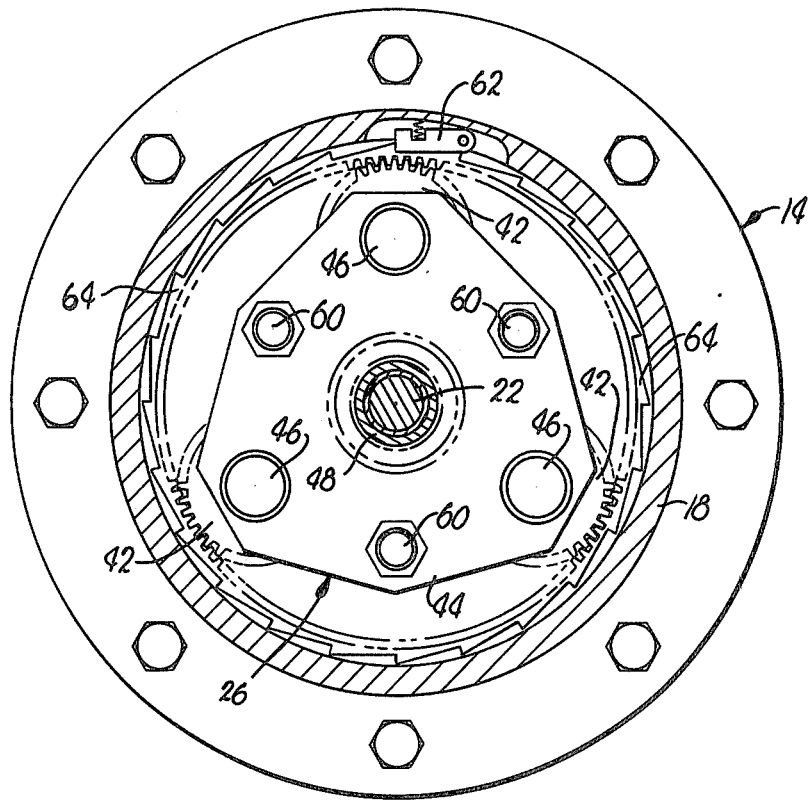
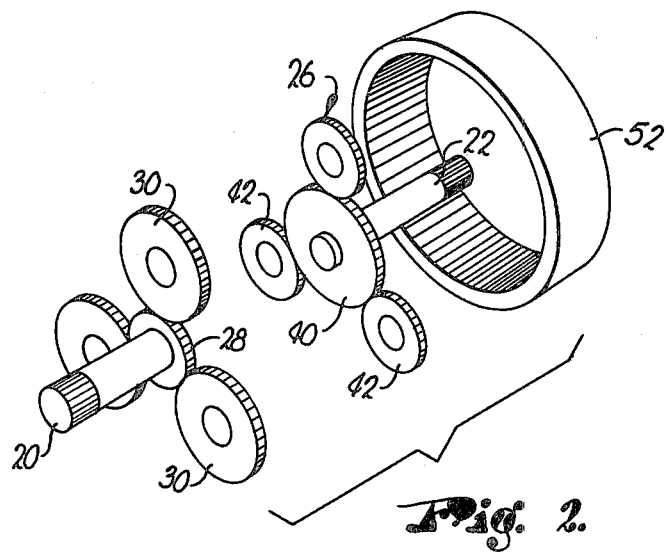
Fig. 2.

AUTOMATIC PLANETARY TRANSMISSION

Transmissions for automobiles, trucks, tractors, bulldozers and other equipment, having greater than normal loads on the transmission output shaft, require high torque and low speed operation during start-up. Thereafter, when the load diminishes, the requirements of the transmission should be in the nature of high speed and low torque operation of the output shaft, preferably changing to a direct drive thereto from the input shaft of the transmission.

Moreover, the transmission should be infinitely variable such that the power transformation from the initial power input to the one-to-one ratio is smooth and gradual. Reduction gearing is, therefore, necessary, arranged for operation throughout the period of time, depending on the load, for the shafts to begin rotating together at the same speeds.

These and other desirable results are achieved through use of my present invention, utilizing either of two types of torque converters in association with a pair of side-by-side planetary gear trains surrounded by a common ring gear. The planetary pinions of the two trains have separate but interconnected carriers and the single ring gear is in constant mesh with all of the pinions of both carriers. Proper selection of sun gear diameters for the two shafts, and, therefore, the sizes of their corresponding pinions, provides the required gear reduction.

FIG. 2 is an exploded perspective view illustrating schematically the gear trains of the transmission;

Figure 3:
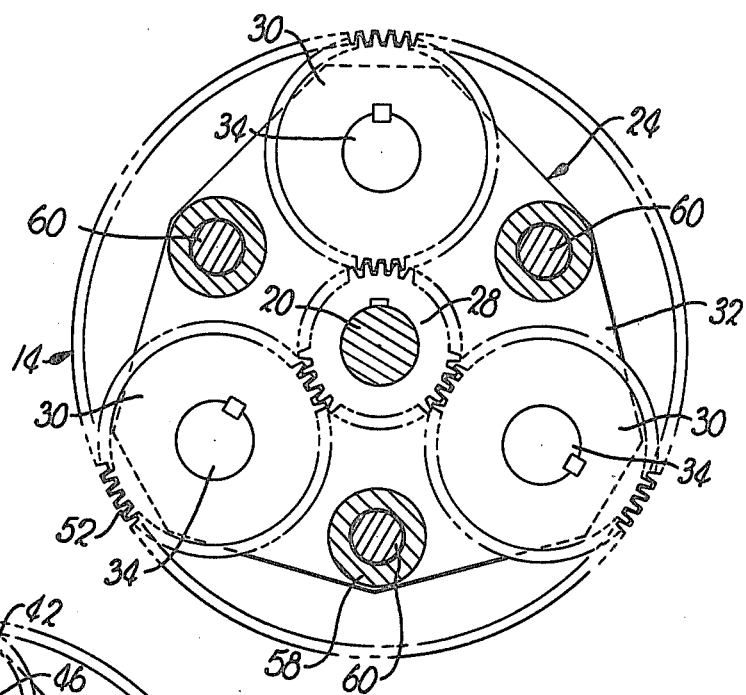
FIG. 3 is an enlarged, longitudinal cross-sectional view through the transmission.
Figure 4:
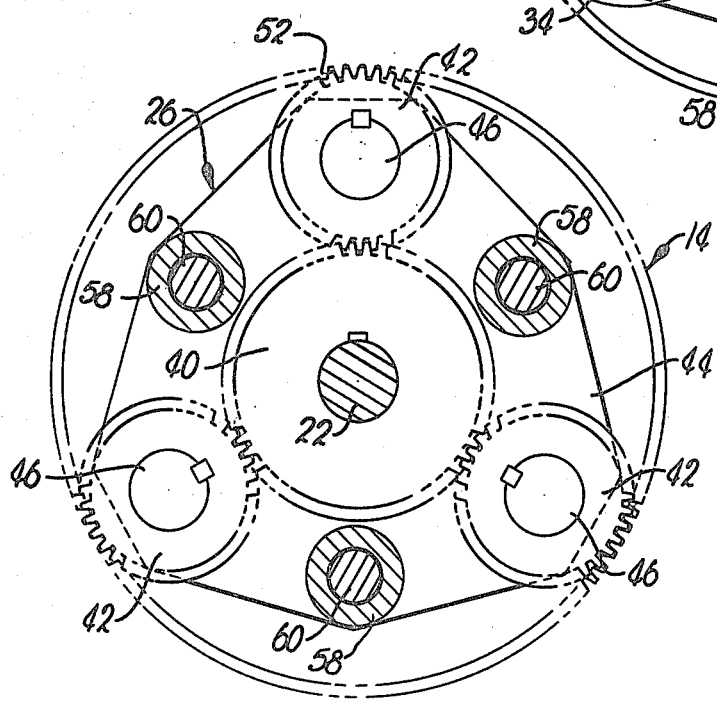
Figure 3:
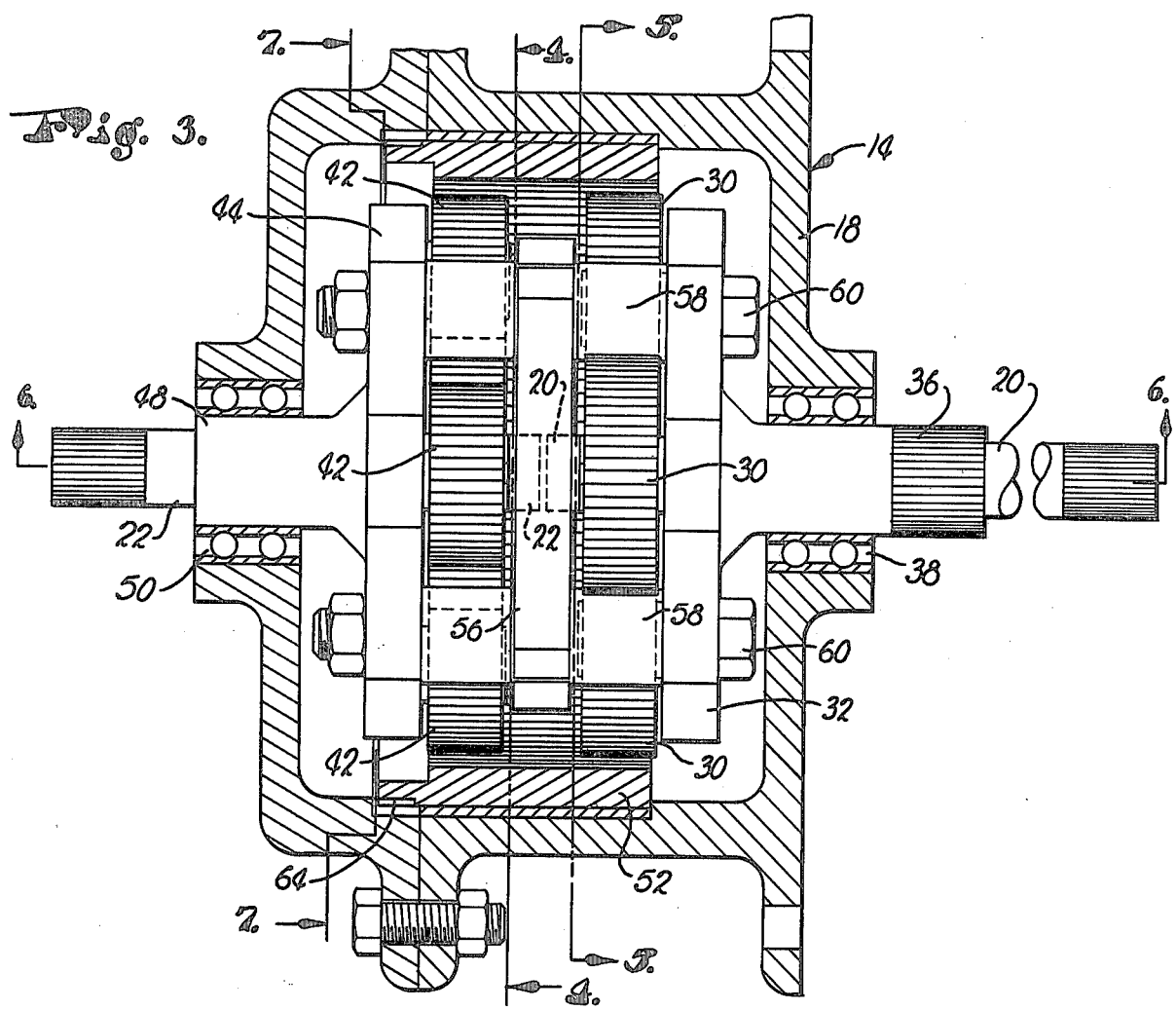
Figure 6:
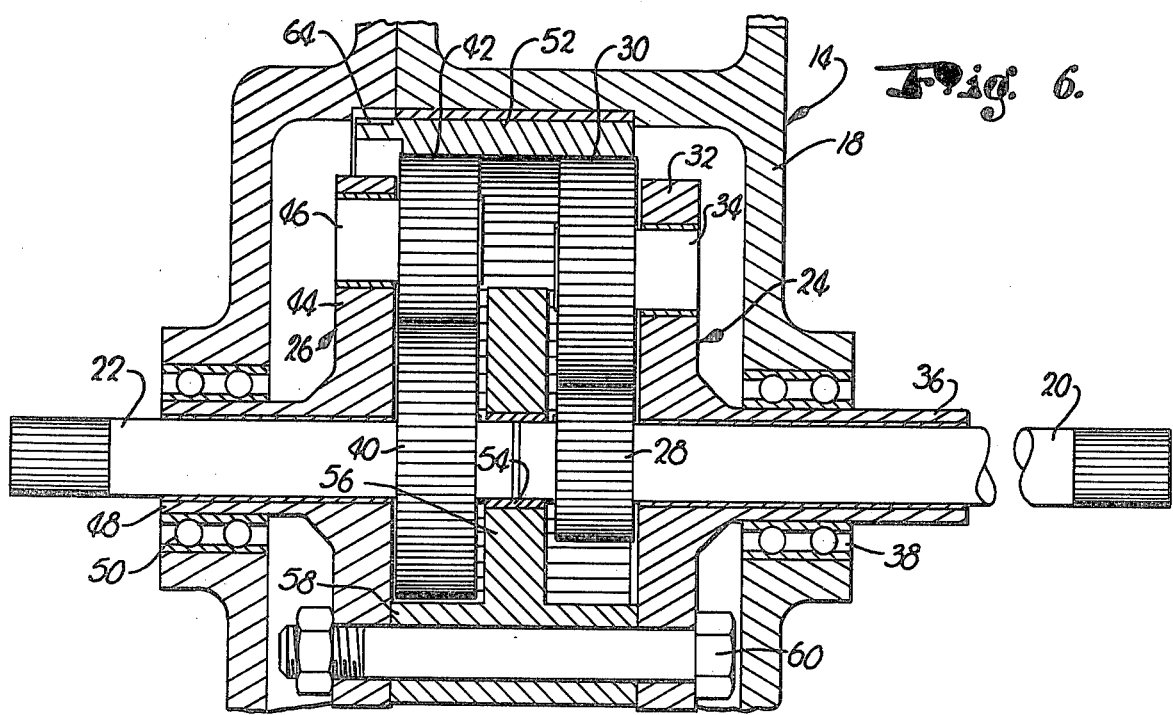
Figure 8:
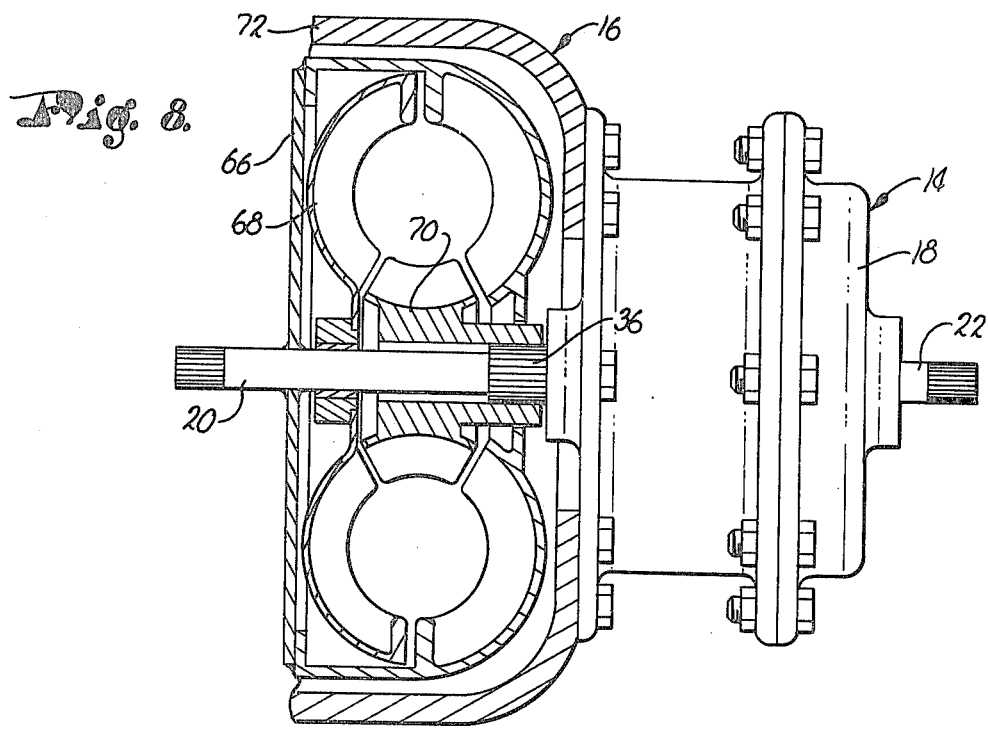
Figure 9:
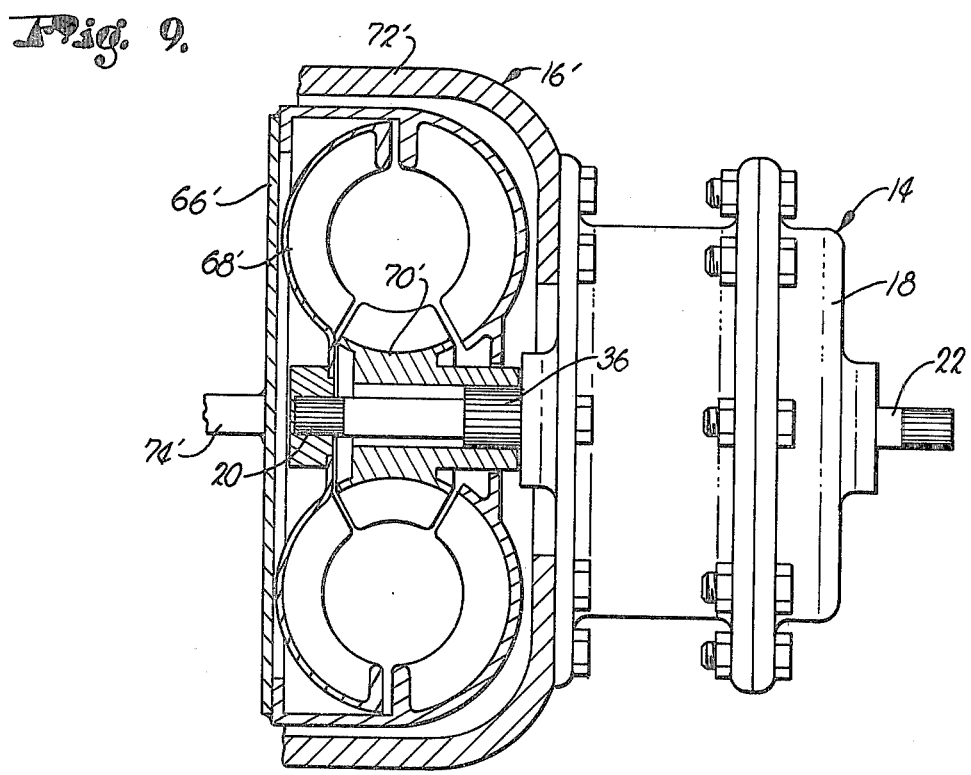

FIGS. 4, 5, 6 and 7 are cross-sectional views taken on lines 4—4, 5—5, 6—6 and 7—7 respectively of FIG. 3;

FIG. 8 is an elevational view of the transmission and one form of torque convertor associated therewith; and FIG. 9 is a view similar to FIG. 8 showing a modified form of torque convertor.

Figure 1:
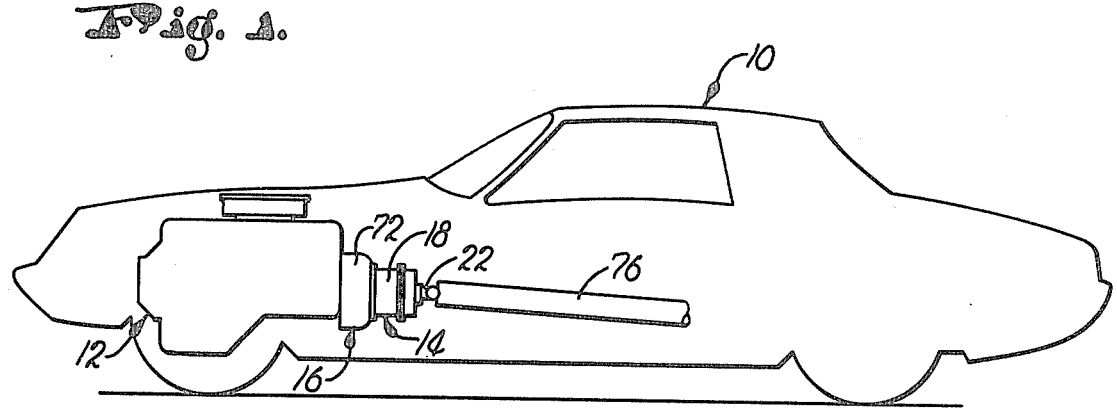
FIG. 1 is a view of a mobile vehicle showing associated therewith an automatic planetary transmission made in accordance with my present invention.

In FIG. 1 of the drawings a mobile vehicle 10 is shown with its engine 12 operatively associated with a transmission 14 and a torque convertor 16 (FIG. 8). The transmission 14, further shown in FIGS. 2-7, has a sectional gear box 18 into which extends an input shaft 20 and an opposed output shaft 22. The box 18 contains a first planetary gear train 24 associated with the shaft 20 and a second planetary gear train 26 associated with the shaft 22.

The train 24 has a first sun gear 28 keyed to the shaft 20, a first series of equal diameter, planetary pinions 30 in mesh with and surrounding the gear 28, and a first, plate-like carrier 32 rotatably supporting the pinions 32 as well as the shaft 20. Each pinion 30 has a support pin 34 secured to the carrier 32, and a first tubular stem 36, integral with the carrier 32, extends outwardly beyond the box 18. The stem 36 is rotatably supported by a first bearing 38 secured to the box 18, and the shaft 20 extends through the stem 36, the carrier 32 and the gear 28, terminating adjacent the proximal inner end of the shaft 22.

The train 26 has a second sun gear 40 keyed to the shaft 22, a second series of equal diameter, planetary pinions 42 in mesh with and surrounding the gear 40, and a second, plate-like carrier 44 rotatably supporting the pinions 42 as well as the shaft 22. Each pinion 42 has a support pin 46 secured to the carrier 44, and a second tubular stem 48, integral with the carrier 44, extends outwardly beyond the box 18 oppositely to the stem 36. The stem 48 is rotatably supported by a second bearing 50 secured to the box 18, and the shaft 22 extends through the stem 48, terminating at its inner end in spaced relationship to the inner end of the shaft 20.

Rotatably supported by the box 18 therewithin is a ring gear 52, common to the trains 24 and 26, surrounding and in mesh with all of the pinions 30–42. The shafts 20 and 22 are held axially aligned by a bushing 54 in a plate-like support 56 between the gears 28 and pinions 30 and the gears 40 and pinions 42, and a number of tubular spacers 58, integral with the support 56, and spaced radially outwardly of the shafts 20 and 22, are interposed between the carriers 32 and 44.

The carriers 32 and 44 are held clamped against the spacers 58 by elongated bolts 60, parallel with the shafts 20 and 22, and passing through the carriers 32 and 44 and through the spacers 58. Hence, the gears 28 and 40, as well as all of the pinions 30 and 42, are disposed between the carriers 32 and 44, and the gear 52 surrounds the support 56, the carrier 44 and the spacers 58. The support 56 is shaped similarly to the carriers 32 and 44 except that it does not extend at its periphery appreciably beyond the spacers 58 inasmuch as it must clear and does not receive the pins 46.

The gear 28 has a diameter smaller than the diameter of the gear 40, and the diameters of the pinions 30 are greater than the diameters of the pinions 42. Alternately, the gears 28 and 40 could be of equal diameters in which event the pinions 30 and 42 would be stepped down unequally. That is, each pinions 30 and 32 would have a toothed periphery meshing with the gear 52 and a second, smaller, toothed periphery meshing with the corresponding gear 28 and 40.

Retrograde rotation of the gear 52 is prevented by a ratchet assembly (FIG. 7) which includes a spring-loaded pawl 62 swingably attached to the box 18 therewithin for movement toward and away from a series of teeth 64 within the gear 52 therearound.

The torque convertor 16 (FIG. 8), disposed exteriorly of the box 18, couples the shaft 20 with the carrier 32. It includes three vaned rotors 66, 68 and 70 surrounding and coaxial with the shaft 20 and the splined end of stem 36, all rotatable within a housing 72. The hollow rotor 66, adapted to contain a hydraulic fluid, is fixed to the shaft 20; the rotor 68 within the rotor 66 is supported by the shaft 20 for free rotation relative thereto; and the rotor 70 within the rotor 66 and rotatable relative to the rotors 66 and 68, is attached to the stem 36.

A modified form of torque convertor 16', shown in FIG. 9 within a housing 72' has three vaned rotors 66', 68' and 70', the same as in FIG. 8. However, an engine shaft 74' is attached directly to the rotor 66'; the rotor 68' is splined to the shaft 20; and the rotor 70' (as in FIG. 8) is splined to the stem 36. This form of convertor 16' has what might be considered in certain operating requirements the disadvantage of rotor slippage in that during initial rotation of the shaft 74' at slow speeds, a substantial load on the shaft 22 is not immediately overcome and no rotation of the latter takes place. On the other hand, when the convertor 16 is employed, the shaft 22 commences to rotate immediately at slow start up speeds of the engine shaft (not shown) coupled in any suitable manner with the shaft 20.

OPERATION

When the shaft 20 is first caused to rotate it effects rotation of the rotor 66 and the gear 28. Force is transmitted from the gear 28 to the pinions 30 for rotation about their own axes 34, but without rotating the gear 52 because of pawl 62. Instead, the rotating pinions 30 and the carrier 32 revolve as a unit and such motion is transmitted to the carrier 44 through the fasteners 60. Hence, the carrier 44 and the pinions 42 also revolve as a unit as the pinions 42 rotate about their own axes 46, rotating the rotor 70. Rotation of the stem 22 commences immediate driving of whatever driven shaft may be coupled with the stem 22, such as at 76 (FIG. 1) leading to the differential (not shown) of vehicle 10.

As the load on the stem 22 is gradually overcome, as the torque requirements are progressively reduced, and as the speed of the shaft 20, and, therefore, the rotor 66 increases, a fluid coupling is established in the convertor 16, causing an increase in the speed of rotation of the rotor 70. When the speeds of rotors 66 and 70 are equal, the gear 52 rotates (anti-clockwise, viewing FIG. 7) as a unit with the trains 24 and 26. The pinions 30 and 42 cease rotating about their own axes 34, 46 and a direct drive is established, with shafts 20 and 22 rotating at the same speed.

Prior to reaching such one-to-one ratio, the gear reduction between trains 24 and 26 produces the initial high torque, low speed advantages needed especially for tractors, bulldozers, certain trucks and other heavy duty equipment, yet have the advantage of progressively increased speeds as the needed torque gradually diminishes.

In FIG. 9, because of normal loads on the shaft 22, the initial low speed, rotative forces applied to the rotor 66' from the shaft 74' do not effect an immediate fluid coupling in the convertor 16' from the rotor 66' to the rotors 68' and 70', with the result that the shaft 20 and the stem 36 do not commence rotating immediately. However, as the speed of the shaft 74', and, therefore, the rotor 66', progressively increases, slippage in the convertor 16' decreases, gradually increasing the speeds of the shaft 20 and the carrier 32 until the direct drive condition is reached as above explained in connection with the convertor 16.

I claim:

1. In a transmission,
a gear box;
an input and opposed output shaft extending into the box;
a first planetary gear train in said box having a first sun gear secured to the input shaft, a first series of equal diameter, planetary pinions in mesh with and surrounding the first sun gear, and a first carrier rotatably supporting the first series of pinions and the input shaft;
a secondary planetary gear train in said box having a second sun gear secured to the output shaft, a second series of equal diameter, planetary pinions in mesh with and surrounding the second sun gear, and a second carrier rotatably supporting the second series of pinions and the output shaft;
means in the box interconnecting the carriers,
said box having means rotatably supporting the carriers;
a ring gear in the box common to the trains, surrounding the pinions and in mesh with the latter,
said box having means rotatably supporting the ring gear,
said shafts having proximal ends;
a support in the box between said trains rotatably receiving the proximal ends of said shafts for holding the same axially aligned; and
a number of spacers integral with said support, spaced radially outwardly of said shafts between the carriers for holding the latter in parallelism.

2. The invention of claim 1; and elongated releasable means interconnecting the carriers, extending through the spacers in parallelism with the shafts, and clamping the carriers to the spacers.

3. The invention of claim 2, the sun gears being between the carriers and the ring gear surrounding the support and the spacers.

4. The invention of claim 3, each carrier having a tubular stem, said stems extending outwardly in opposite directions and being rotatably supported by the box, said shafts extending through corresponding stems.

5. The invention of claim 4, the first sun gear having a diameter smaller than the diameter of the second sun gear, the diameters of the first series of pinions being greater than the diameters of the second series of pinions.

6. The invention of claim 5; and a ratchet assembly between the box and the ring gear for preventing retrograde rotation of the latter.

7. The invention of claim 6; and a hydraulic torque convertor exteriorly of said box having a pair of vaned rotors rigidly connected to the input shaft and to the first carrier respectively.

8. The invention of claim 7, said convertor having a third vaned rotor adapted for connection with the power shaft of a prime mover.

* * * * *